United States Patent [19]

Minot et al.

[11] Patent Number: 5,717,687
[45] Date of Patent: Feb. 10, 1998

[54] DATA COMMUNICATION SYSTEM WITH ADAPTIVE ROUTING, AND SWITCHING NODE INTENDED TO BE USED IN SUCH A SYSTEM

[75] Inventors: Joël Minot, Charenton; Daniel Salingre, Massy, both of France

[73] Assignee: U.S. Philips Corporation, New York, N.Y.

[21] Appl. No.: 523,833

[22] Filed: Sep. 6, 1995

[30] Foreign Application Priority Data

Sep. 7, 1994 [FR] France .................. 94 10723

[51] Int. Cl.⁶ .................................. H04J 3/02
[52] U.S. Cl. ............... 370/257; 370/396; 370/408; 370/409
[58] Field of Search ................. 370/392, 395, 370/400, 401, 402, 406, 256, 257, 396, 397, 408, 409

[56] References Cited

U.S. PATENT DOCUMENTS

| | | | |
|---|---|---|---|
| 4,864,563 | 9/1989 | Pavey et al. | 370/254 |
| 4,897,835 | 1/1990 | Gaskill et al. | 370/314 |
| 5,502,726 | 3/1996 | Fischer | 370/392 |

FOREIGN PATENT DOCUMENTS

| | | | |
|---|---|---|---|
| 0180990A3 | 5/1986 | European Pat. Off. | G06F 12/06 |
| 0493905A1 | 7/1992 | European Pat. Off. | H04L 12/24 |
| 9303086 | 3/1993 | France . | |

OTHER PUBLICATIONS

International Standard ISO/IEC 10589:1992.
IEEE Infocom '92, 1992 Florence, Italy, pp. 626–632, Cohen et al, "IP Addressing and Routing in a Local Wireless Network".
Search Report.

*Primary Examiner*—Douglas W. Olms
*Assistant Examiner*—Min Jung
*Attorney, Agent, or Firm*—David R. Treacy

[57] ABSTRACT

An adaptive routing protocol for a data communication system that operates in the connection mode. Therefore, the nodes have a function of detecting their neighboring nodes, which permits establishing sessions with their neighbors without previously knowing them, so as to transmit to them recognition messages which indicate their own identifier. Each node additionally has a double identifier of which one identifier is formed by the serial number of the node, so that the serial number can be detected in the system before any configuration and this, more particularly, by a terminal dedicated to managing the system entrusted with the remote configuration of the nodes.

10 Claims, 2 Drawing Sheets

DATA COMMUNICATION SYSTEM WITH ADAPTIVE ROUTING, AND SWITCHING NODE INTENDED TO BE USED IN SUCH A SYSTEM

BACKGROUND OF THE INVENTION

1. Field of the Invention

The present invention relates to a data communication system comprising a plurality of nodes interconnected by links, certain of these nodes at least comprising detecting means for detecting their neighbours for implementing an adaptive routing function.

The invention has highly significant applications in the field of data communication networks, and specifically in wide area networks operating in the connection mode such as the X25 networks, for example, more particularly when they are used for interconnecting local area networks.

One of the essential problems encountered in this type of networks is the load and considerable risk of faults which results from the manual configuration of the routing Tables.

2. Discussion of the Related Art

In the field of local area networks protocols of adaptive, decentralized routing with a local route calculation such as, for example, the IS-IS protocol normalized by OSI referenced 10589 are known to be used. Such protocols, which make it possible to create and update the routing Tables automatically, suppose that each node is capable of recovering information in the whole system or part of the system, and then derive therefrom the best routes to the remote nodes. This type of routing thus dynamically adapts itself to the changes of the topology of the system (which are due to, for example, an overload, a failure, an insertion or a removal of a link or of a node).

The invention proposes to apply this type of adaptive routing protocol to data communication systems operating in the connection mode and, more specifically, to packet switched wide area networks.

The main problem then posed for each node of the system is that of detecting its neighbours, because any communication between two nodes supposes that previously a session is established between these two nodes.

SUMMARY OF THE INVENTION

Therefore, a data communication system according to the invention and as described in the opening paragraph is characterized in that, with the data communication system operating in the connection mode, at least two of these nodes comprise for detecting their neighbours, means for:

transmitting a call request message on at least certain ones of their links, establishing a session with a neighbouring node upon reception of such a call request message coming from said node, transmitting to the neighbouring node a recognition message indicating their own identifiers once a session has been established with this neighbouring node.

It is thus possible to avoid any previous configuration of the nodes of the system with respect to the topology of the whole system: this topology is recognized automatically.

In a particularly advantageous embodiment of a data communication system according to the invention, the identifier of a node is formed by its serial number and by its logical address.

Thus, when a node cannot be reached via its logical address, it is always accessible via its serial number. More particularly, when the nodes leave the factory, a unique serial number is assigned to them, but their logical address is formed by a default value which is the same for all the nodes. The fact that each node is identified both by its serial number and by its logical address makes it possible to connect this node to a network without having previously configured its logical address. The node will thus be identified by the whole system on the basis of its serial number.

In another advantageous embodiment, a system according to the invention comprises a terminal called management centre and dedicated to managing the system, connected to a node via which it establishes sessions with nodes of the system so as to transmit configuration information to these nodes.

It is thus possible to remotely configure the logical address of each node and to transmit any further configuration information that is necessary. The invention thus makes it possible to avoid the site configuration of the nodes of the system and limits the installation phase of the network to connecting its various pieces of equipment.

In another embodiment of a system according to the invention, the nodes of the system which comprise said adaptive routing function are spread over at least one routing information domain.

This makes it possible to ensure that the nodes which have an adaptive routing function such as described above exist side by side with conventional nodes in the same system.

The invention likewise relates to a node intended to be used in such a system, and more particularly, an X25 switch which has an adaptive routing function as described above.

These and other aspects of the invention will be apparent from and elucidated with reference to the embodiments described hereinafter.

DESCRIPTION OF PREFERRED EMBODIMENT

The invention will now be described on the basis of a data communication network of the type X25 shown in FIG. 2. It is, however, applicable to any other network operating in the connection mode.

Figure 1:
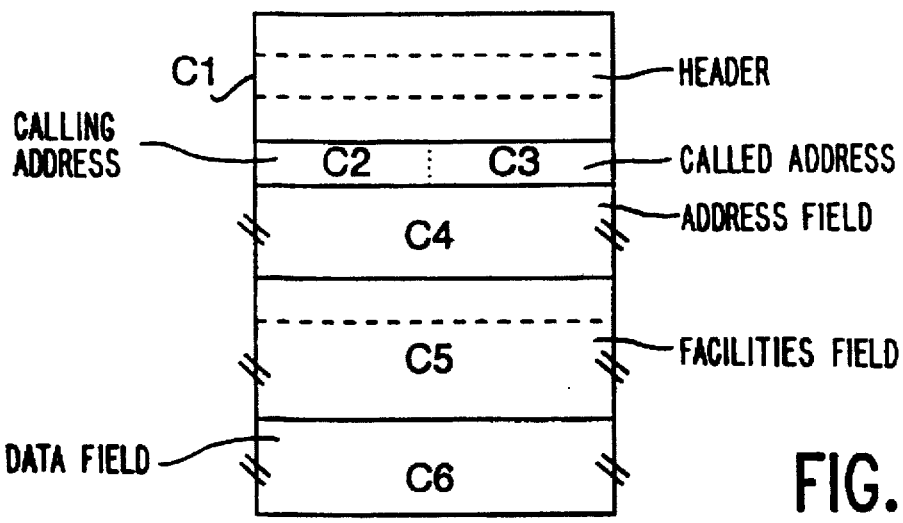
FIG. 1 represents an X25 call setup packet.

According to the invention, certain nodes of such a network have an adaptive routing function. Such a function further includes a function of detecting the immediate neighbour of the node, which detection function consists of transmitting a call request packet according to the X25 standard on each link of the node when the link is used. Such a call request packet is shown in FIG. 1. It starts just like all the X25 packets by a header C1 containing three octets, which indicates, amongst other things, a number of the virtual circuit and the type of packet (here it is a call request packet which corresponds to the code 00001011). This header C1 is followed by a field indicating the length of the calling address (C2) and that of the called address (C3), which itself is followed by the actual address field C4 (X25 address of the calling and called addresses). Now comes a field called facilities field C5 which permits of a specification of particular characteristic features for the connection. Finally, a data field C6 permits of sending up to 16 data octets in the call request packet. According to the invention, the called address specified in this call request packet is an address fixed by convention which indicates that this packet is addressed to the adaptive routing function of the nodes, and the data field is used to indicate an opening request of a virtual circuit dedicated to the adaptive routing.

If the immediate neighbours of the node respond to this call request packet by a call accepted packet (field type 00001111), they are considered to have also an adaptive routing function according to the invention.

A virtual circuit dedicated to the routing is then established with each of its neighbours. Each circuit is first of all used for exchanging a packet called "Hello" packet defined in the IS-IS norm between the two nodes. Such a "Hello" packet, which contains the identifier of its source node, makes it thus possible for the node that receives the identifier to detect the identifier of its neighbour. Then, afterwards, these virtual circuits are used for exchanging packets called LSP packets which are also defined by the IS-IS standard and contain a list of said neighhours as well as information about the links between the source node of the LSP packet and each of the nodes of the list. Such LSP packets are formed and transmitted in the adaptive routing domain following an exchange of a "Hello" packet between two neighbours and after that periodically and in exceptional cases subsequent to a change of the topology of the domain. Each node writes in its base, called LSP base, the most recent LSP packet transmitted by each node of the domain. This base makes it possible for the node to calculate periodically trees of the best routes to the other nodes of the domain.

According to the invention and in conformity with the IS-IS standard, the information relating to each link between the node and its neighbouring nodes is written in an LSP packet in the form of:

a serial number of the neighbouring node on the link, a number of the link, and three metrics permitting of featuring the quality of the link as a function of a given criterion: one metric which represents the number of links passed, and whose value is thus always equal to 1 between two neighbouring nodes, one financial metric which indicates the cost of the link, and one delay metric which indicates the delay of the transit and dynamically takes the traffic on the link into account.

According to the invention, each node is referenced by a double identifier: its serial number, on the one hand, and its logical address on the other. This means that the "Hello" packet and LSP packet contain this double identifier. In an embodiment of the invention there has been chosen to use the field of "identifier of the source node" of the IS-IS packets to indicate the serial number of the node, and the "domain address" fields to indicate various addresses of the same node, and, more particularly, its logical X25 address (these "domain address" fields were used in the IS-IS standard to give various domain identifiers to the same node).

This also means that a double access to routing trees is inserted (via serial number and via logical address). Thus, when a calling node seeks to establish a communication with a called node, there will be two cases. In the first case, the calling node knows the called node by its logical address. It then places this logical address in the field provided for this purpose in the X25 call request packet. In the second case, the calling node only knows the called node by its serial number. It then places in the data field of the X25 call request packet an indicator which indicates that the routing is to be effected via the serial number of the called node, followed by that serial number. And it writes in the logical address field of the called node the address fixed by convention, which address indicates that this packet is addressed to the adaptive routing function of the node. Thus, each node receiving such a call request packet starts reading the contents of the logical address field of the called node. If it is the address fixed by convention, the packet is transmitted to the adaptive routing function of the node that reads the data transmitted in the call request packet. If these data comprise said routing indicator, the adaptive routing function directs this packet in accordance with its serial number. The route to be utilized is thus sought in the routing tree that corresponds to the metric selected on the basis of said serial number. If, on the other hand, the logical address field of the called node indicates a logical address, the route to be used is sought in the routing tree on the basis of this logical address.

Figure 2:
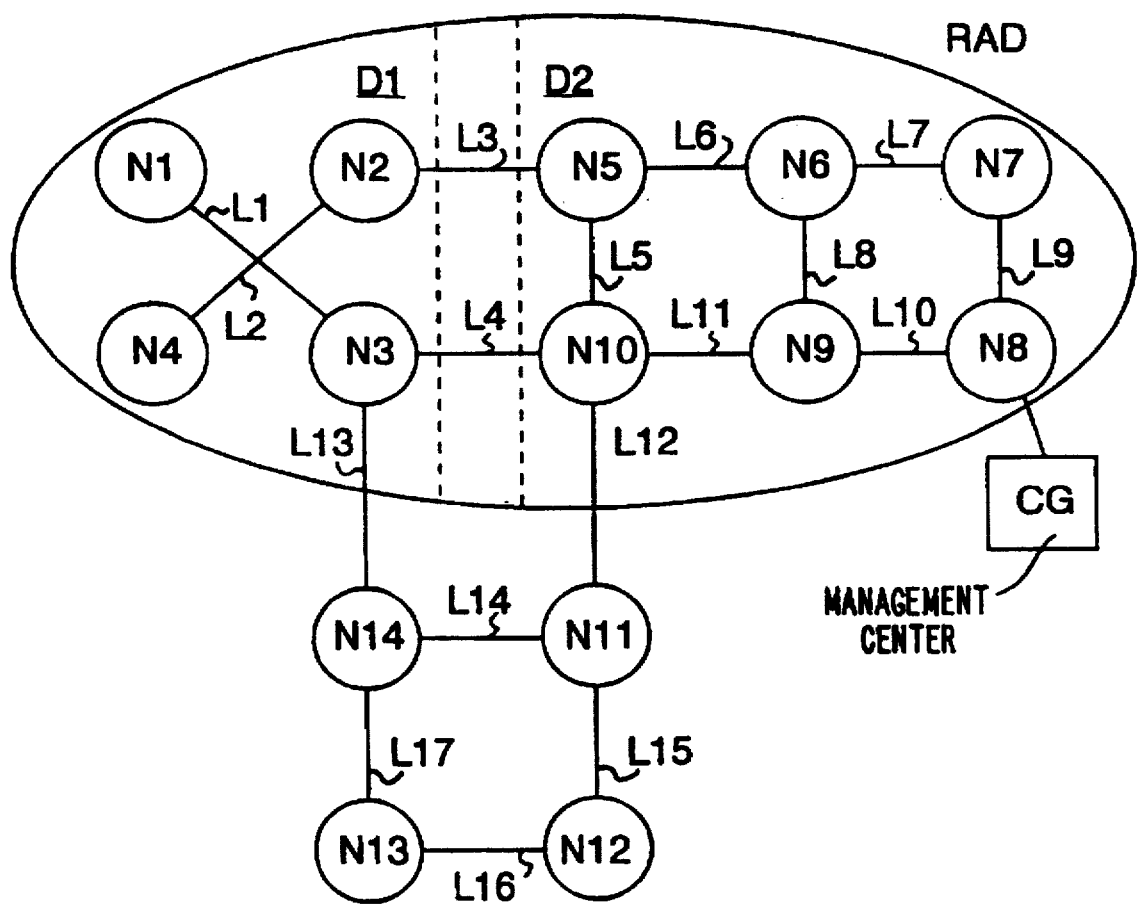
FIG. 2 represents a telecommunication network forming a system according to the invention.

FIG. 2 shows an example of a data communication network according to the invention. Such a network comprises a plurality of nodes numbered N1 to N14. Node N3 is connected to nodes N1, N10 and N14 by the links L1, L4 and L13, respectively. Node N2 is connected to nodes N4 and N5 by the links L2 and L3, respectively. Node N10 is connected to nodes N5, N9 and N11 by the links L5, L11 and L12, respectively. Node N6 is connected to nodes N5, N7 and N9 by the links L6, L7 and L8, respectively. Node N8 is connected to nodes N7 and N9 by the links L9 and L10, respectively. Node N13 is connected to the nodes N14 and N12 by the links L17 and L16, respectively. And, finally, node N11 is connected to the nodes N12 and N14 by the links L15 and L14, respectively.

When the network is created, an administrator works out its topology (serial number and logical address of the nodes, links between the pieces of equipment and features of these links . . . ). This topology is written in a terminal C6, called management centre, and which is connected to a node that has an adaptive routing function (node N8 in FIG. 2). The installation of the network is thus limited to the connection according to this topology of the various entities in their configuration as they leave the factory, called default configuration. The moment the nodes and their links configured by default are being used, the phase of detecting neighbouring nodes commences. The nodes are referenced by their serial number and there is no idea of domain in the network. According as the neighbouring nodes are detected, a domain called adaptive routing domain and denoted RAD is formed by nodes which have an adaptive routing function.

When the autoconfiguration phase of the network is commenced, the management centre CG is connected to the adaptive routing function of a node of the network via its connecting point N8, so as to observe the received LSP packets. The arrival of an LSP packet indicates to the management centre that the sending node of this packet and its default links are in operation and that the route to reach them is known. Thus, from that time onwards it is possible to connect to said node so as to transmit thereto configuration information relating to this node by commencing, however, at the nodes most remote from the management centre, so that any conflict is avoided between the default configuration made at a factory and the configuration defined by the administrator.

This configuration information transmitted by the management centre specifically contains the logical address of the node as well as the characteristic features of all the links. It is possible that new links other than the default configuration links are thus defined. This has in certain cases the consequence of revealing new nodes which will thus obtain in their turn a configuration from the management centre.

On the other hand, each node having an adaptive routing function is thus to cover a restricted part of the network in order to avoid that the size of its bases and the processing time necessary for implementing this function become too large. Therefore, the adaptive routing domain is customarily organized in a plurality of domains, while the knowing of each node is restricted to the domain this node belongs to.

Thus according to FIG. 2, the domain RAD is formed by two domains D1 and D2, domain D1 being formed by nodes N1 to N4 and domain D2 by the nodes N5 to N10. The nodes N2 and N3, on the one hand, and the nodes N10 and N5, on the other, are used as respective bridges to the domains D2 and D1. The nodes N3 and N10 are also used as output bridges for the domain RAD, thus making it possible to reach the nodes N11 to N14 which, as they do not have an adaptive routing function, use a fixed routing.

According to the invention, the subdivision of the adaptive routing domain into various domains is made by configuring the links between the nodes. Among the configuration parameters for each link there is an indicator that defines the intra-domain or extra-domain nature of the link. At the beginning, the default configuration of the links is an intra-domain configuration. Then, depending on whether the links have obtained the configuration of inter-domain links from the management centre, various domains are formed within the RAD. In effect, the nodes only maintain and establish virtual circuits dedicated to the adaptive routing via the intra-domain links, so that after a certain period of time the nodes of different domains do not exchange LSP packets any more and forget each other.

By way of example, and while reference is made to FIG. 2, link L3 which connects the nodes N2 and N5 is initially configured by default in each of said nodes as an intra-domain link. A virtual circuit dedicated to the adaptive routing can thus be established between the nodes N2 and N5 at the start, so that LSP packets transmitted via the nodes N5 to N10 are written in the LSP bases of the nodes N2 to N4 and vice versa. Then, during the autoconfiguration phase, the management centre makes a configuration of the nodes N2 and N5 and, more particularly, reconfigures the link L3 as an inter-domain link. Said virtual circuit is then closed and no information relating to the topology of the network is exchanged any longer between the two nodes. The same holds for the nodes N3 and N10, so that at the end of a certain period of time the LSP packets relating to the nodes N5 to N10 are deleted from the LSP bases of the nodes N1 to N4, and reciprocally, thus forming two separate domains D1 and D2.

In order to make the inter-domain routing possible, each node further includes a Table called configurable routing Table, which has priority over adaptive routing Tables as will be made clear in the following, and which contains amongst other things the list of the nodes that do not belong to the same domain with, as the case may be, the bridging node or the link to be used to reach the domain to which they belong. This Table is also produced by the management centre in the autoconfiguration phase.

Finally, in the example shown in FIG. 2, it has furthermore been supposed that the nodes N11 to N14 did not have an adaptive routing function according to the invention. During the neighbour-detecting phase, two cases are then likely to occur. In the case where the lines L12 and L13, which connect the respective nodes N10 to N11 and N3 to N14, are configured as inter-domain lines, the nodes N11 and N14 do not receive specific neighbour-detecting call request packets. On the other hand, if they are configured as intra-domain links, which corresponds to the default configuration, the node N11 and N14 won't accept the specific call request transmitted by the nodes N3 and N10 and will therefore not be included in the adaptive routing domain.

Figure 3:
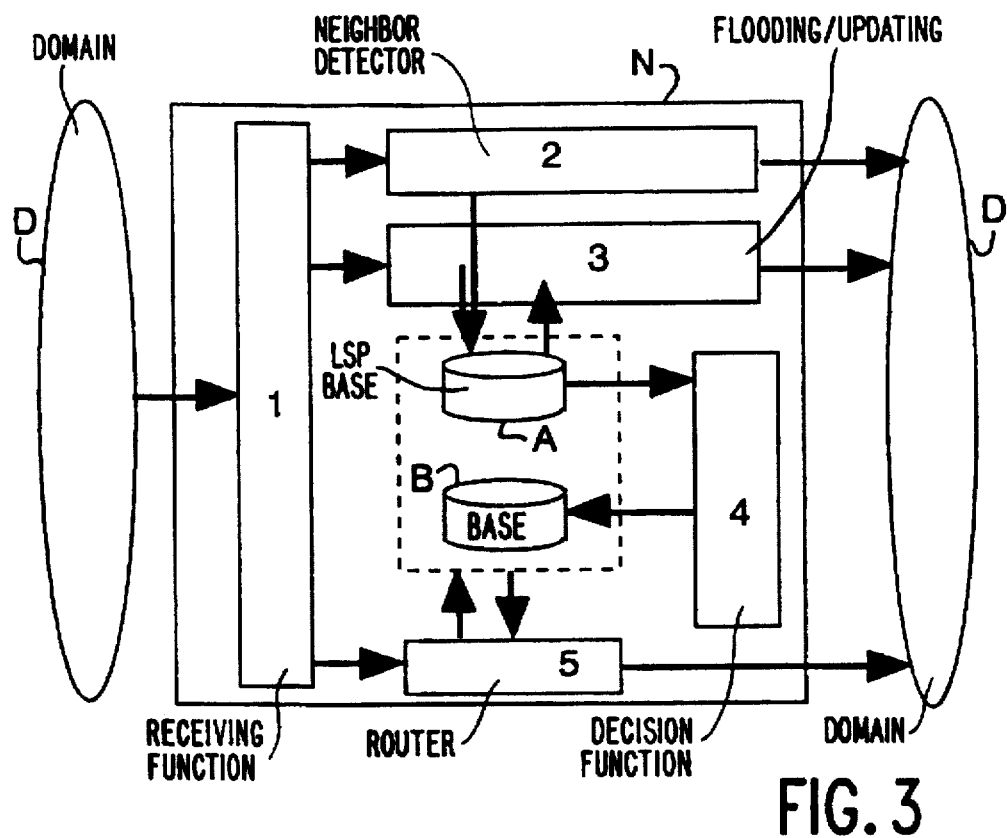
FIG. 3 represents in a diagram the mode of operation of a node which has an adaptive routing function.

FIG. 3 summarizes in a diagram the operation of a node N which has an adaptive routing function:

A receiving function 1 makes it possible to separate the received packets coming from a domain D to which the node belongs: the X25 call request packets requesting the opening of a virtual circuit dedicated to the routing, which packets do not contain any destination, are processed by the neighbour-detecting function 2 described earlier; the X25 call request packets which request the opening of a virtual circuit for a communication with a given node are processed by a routing function 5; and the LSP packets are processed by a flooding/updating function 3.

The flooding/updating function 3 calculates periodically, or the moment a change occurs on one of the links of the node, the cost for each metric of each one of these links, to form an LSP packet which is written in the LSP base referenced A in the drawing Figure, and which packet is then transferred to the domain D. It similarly writes and transfers the LSP packets coming from other nodes of the domain D.

A decision function 4 calculates for each metric the routes which make it possible to reach each node of the domain based upon information contained in the base A of the node. A tree of shortest routes is determined on the basis of these results for each metric in conformity with the method described in French Patent Application no. 9303086 fled by the Applicants on 17 Mar. 1993. The trees thus obtained are written in another base B.

According to the routing function 5, when a node seeks to establish a communication with a remote node, or when it receives the instruction to convey the communication in its domain, it first seeks in its configuration Table whether the destination of this packet corresponds to an output bridge of the domain. In that case the packet is directed to the address of this bridge instead of being directed to the address of the called node of the packet. And in that case, according to a variant of the invention, to avoid having to determine the output bridge of the domain at each intermediate node which forms part of the route to the output bridge, it is the address of this bridge that is written in the called address field of the X25 call request packet, the final address being conveyed in its complementary services field (C5).

After the equipment to be reached has been determined (destination node or output bridge of the domain), the routing tree indicates in the form of a list of nodes the route that minimizes the considered metric, as well as the output link that corresponds to the first node of this route.

In a first embodiment the choice of the metric used is made for a whole domain at a given instant by the configuration. This choice is advantageously transmitted to the various nodes of the domain via the management centre. In another embodiment, the choice of the metric is indicated in the X25 call request packet. This solution, however, has the drawback of implying the use of a particular packet format which is different from the X25 format as it is currently normalized.

By way of example, and with reference to FIG. 2, if the node N7 seeks to establish a communication with the node N1 which belongs to domain D1, it first of all searches for this node in its configuration Table. It then obtains the bridging node to be used to reach the node N1, that is to say, N10. The least costly route to follow to reach N10 is selected in the routing tree that corresponds to the metric used, and a call setup packet is transmitted addressed to this bridging node. The node N10 itself seeks in its configuration Table the node to which it is to transmit this call setup packet, that is to say, node N3. The node N3 finds in its routing tree the destination of this packet as well as the best route to follow to reach it.

Figure 4:
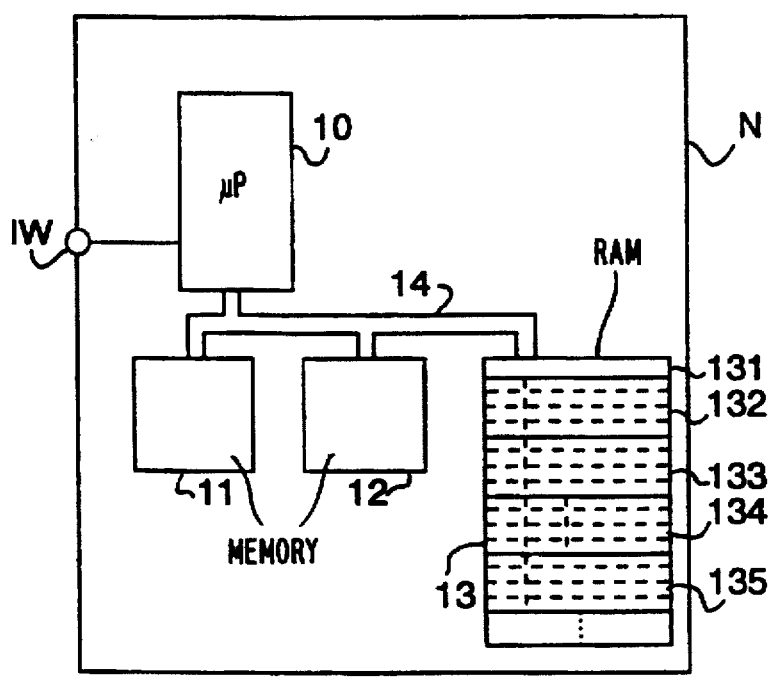
FIG. 4 represents an X25 switch according to the invention.

FIG. 4 shows an X25 switch according to the invention, denoted N. Such a switch comprises at least an X25 interface network referenced IW which is connected to an application processor 10 formed, for example, by a Motorola 68360. This processor 10 itself is connected by a bus 14 to a memory 11 which specifically contains the serial number of the node. The processor 10 is also connected by this bus 14 to a static memory 12 which contains the operating instructions of the processor 10, more specifically, those necessary for implementing the invention, and to a random access memory 13 which contains data and, more particularly, its logical address at the location 131, the numbers and characteristic features of its links at location 132, its configuration Table at location 133, the routing trees at location 134 and its LSP base at location 135.

It will be clear to those of ordinary skill that modifications may be made in the embodiment that has just been described, more specifically, by substituting equivalent technical means, without leaving thereby the scope of the present invention.

More particularly for managing multi-domain networks, in the Preferred embodiments each domain is independent and that passing from one domain to another takes place by fixed routing. The principle of multilevel routing recommended by IS-IS also falls within the scope of the invention.

We claim:

1. A data communication system comprising a plurality of nodes interconnected by links, at least certain of said nodes comprising detection means for detecting neighboring nodes for implementing an adaptive routing function, wherein one of said certain of said nodes comprises recognition means, and responsive to operation of the data communication system in a connection mode, said recognition means comprises:

means for transmitting a call request message on at least certain ones of links connecting to said one node, means for establishing a respective session with a given neighboring node, upon reception of such a call request message coming from said given neighboring node, and means for transmitting to the given neighboring node a recognition message indicating a double identifier of said one node once a session has been established with the given neighboring node, and at least another of said certain of said nodes comprises respective recognition means.

2. A system as claimed in claim 1, for operation as an X25 network, characterized in that, responsive to receipt of a message to be retransmitted containing a single identifier part only of said double identifier, a node determines routing of the message according to an adaptive routing function, responsive to receipt of a message containing the other part of said double identifier, the node determines routing of the message according to a routing tree based on said other part.

3. A system as claimed in claim 2, characterized in that said given one identifier is a serial number, and an X25 call request packet for the message contains, in an address for a logical address, an address fixed by convention.

4. A system as claimed in claim 1, characterized in that each double identifier is formed by the serial number of the respective node and by the logical address of the respective node.

5. A system as claimed in claim 4, further comprising a management center for managing the system, said management center being connected to a given one of said certain nodes, and said management center transmits configuration information to other nodes of the system via said given one of said certain nodes.

6. A system as claimed in claim 4, characterized in that a plurality of said certain of said nodes, which comprise said recognition means, are spread over at least one routing domain.

7. A network node for use in a data communication system comprising a plurality of said nodes interconnected by links, wherein said network node comprises recognition means for detecting neighboring nodes for implementing an adaptive routing function, and responsive to operation of the data communication system in a connection mode, said recognition means comprises:

means for transmitting a call request message on at least certain ones of links connecting to said one node, means for establishing a respective session with a given neighboring node, upon reception of such a call request message coming from said given neighboring node, and means for transmitting to the given neighboring node a recognition message indicating a double identifier of said one node once a session has been established with the given neighboring node.

8. A network node as claimed in claim 7, characterized in that said double identifier is formed by the serial number of the network node and by the logical address of the network node.

9. A network node as claimed in claim 7, for operation in an X25 network, characterized in that responsive to receipt of a message to be retransmitted containing a single identifier part only of a double identifier of a called node, the network node determines routing of the message according to an adaptive routing function, and responsive to receipt of a message containing the other part of said double identifier of a called node, the network node determines routing of the message according to a routing tree based on said other part.

10. A node as claimed in claim 7, arranged for use as a switch in an X25 packet switching network.

* * * * *